United States Patent [19]
Combs et al.

[11] Patent Number: 5,752,497
[45] Date of Patent: May 19, 1998

[54] PORTABLE OUTDOOR SOLID FUELED COOKING ASSEMBLY

[76] Inventors: Glenn A. Combs, 1500 Glenmar Ave., Monroe, La. 71201; James Michael Axen, 139 Cheniere Baptist Church Rd., West Monroe, La. 71291

[21] Appl. No.: 683,777

[22] Filed: Jul. 16, 1996

[51] Int. Cl.$^6$ ..................................................... A47J 37/00
[52] U.S. Cl. ........................................ 126/25 R; 126/25 A
[58] Field of Search ........................... 126/25 R, 25 AA, 126/25 A, 77, 59, 204, 205, 41 R, 9 R, 9 A, 9 B

[56] References Cited

U.S. PATENT DOCUMENTS

| | | | |
|---|---|---|---|
| 974,290 | 11/1910 | Merritt | 126/77 |
| 2,968,301 | 1/1961 | Cowart . | |
| 3,033,191 | 5/1962 | Bonadiman . | |
| 3,276,440 | 10/1966 | Sazegar | 126/25 A |
| 3,379,190 | 4/1968 | Leach . | |
| 3,477,360 | 11/1969 | Raney . | |
| 3,561,348 | 2/1971 | Weir, Sr. . | |
| 4,414,956 | 11/1983 | Webber | 126/59 |
| 4,905,659 | 3/1990 | Armistead | 126/25 A |
| 4,911,140 | 3/1990 | Robinson | 126/59 |
| 4,913,126 | 4/1990 | McCall | 126/204 |
| 4,934,260 | 6/1990 | Blevins . | |
| 4,966,125 | 10/1990 | Stephen et al. | 126/25 R |
| 5,213,027 | 5/1993 | Tsotsos et al. . | |
| 5,325,841 | 7/1994 | Hooper, Sr. . | |

*Primary Examiner*—James C. Yeung
*Attorney, Agent, or Firm*—Richard C. Litman

[57] ABSTRACT

A portable outdoor solid fueled cooking assembly including a metal shell with a pair of side walls and top and bottom opposing walls defining an interior combustion chamber. The cooking assembly also includes an air inlet protruding from a bottom portion of one of the side walls and a flue gas outlet detachably secured to the top wall. The flue gas outlet has a sliding damper mechanism attached thereto. The cooking assembly further includes an adjustable air register plate affixed to the air inlet and a removable, vertically adjustable ash and fuel pan entirely contained within the interior combustion chamber. A metal grill is removably supported inside the chamber. The grill has a grease drippings pan detachably secured to a portion thereof. The cooking assembly permits a user to ignite a heat source placed onto the fuel pan; rapidly obtain the proper temperature for cooking at least one variety of foodstuffs in a variety of different ways; vary the cooking temperature with a reasonable degree of precision; and quickly and efficiently extinguish the heat source in order to ready the assembly for transport and salvage any remaining fuel material for subsequent cooking cycles.

18 Claims, 4 Drawing Sheets

PORTABLE OUTDOOR SOLID FUELED COOKING ASSEMBLY

BACKGROUND OF THE INVENTION

1. Field of the Invention

The present invention relates generally to cooking devices, and more particularly to a portable solid fueled barbecue assembly.

2. Description of the Prior Art

It has long been desirable to cook foodstuffs over solid carbonaceous fuels because of their ability to impart enhanced smoked flavor to the foodstuffs. However, cooking with an assembly which only uses solid carbonaceous fuels normally requires a relatively substantial start-up time, generally requiring thirty to sixty minutes from fuel ignition before any cooking can be done. Furthermore, such assemblies have limited fuel efficiency, requiring additional charging of fuel materials for each cooking cycle. In most such assemblies, a tight sealing cooking assembly is not considered useful nor important. In all such assemblies, accurately measuring and controlling the cooking temperature can be difficult due to a variety of factors, sometimes leading to over-cooked or dried-out foodstuffs.

It is due to this slow start-up time that many users have switched to cooking assemblies which employ gaseous or liquid hydrocarbon fuel. Gas or liquid hydrocarbon fueled assemblies generally require only five to ten minutes start-up time. However, such assemblies do not impart the preferred smoked flavor to the foodstuffs when compared to solid carbonaceous fueled assemblies. Furthermore, due to equipment design, the useful life of many outdoor cooking assemblies is often limited to a maximum of about ten years.

Examples of the above-mentioned prior art include U.S. Pat. Nos. 2,968,301 issued Jan. 17, 1961, to R. J. Cowart; 3,379,190 issued Apr. 23, 1968, to C. C. Leach; and 5,213,027 issued May 25, 1993, to Tsotsos et al. These examples disclose structures for raising or lowering the hot fuel relative to the grill. Cowart teaches a separate adjustable fire lift or vertical support to be used in conjunction with a non-portable fire pit. Leach teaches two separate, moveable cantilever fire supports manipulatable from the outside of the combustion chamber, wherein the bottom of the fire supports have radially slotted draft devices. Similarly, Tsotsos et al. teaches an elevator mechanism, manipulated from the outside, for increasing or decreasing the distance the hot fuel is from the grill. However, Tsotsos et al. uses a combination of an overhead infrared heating element and bottled gas as fuel.

Further examples of the prior art include U.S. Pat. Nos. 3,477,360 issued Nov. 11, 1969, to W. H. Raney; 3,561,348 issued Feb. 9, 1971, to J. E. Weir, Sr.; 4,934,260 issued Jun. 19, 1990, to M. F. Blevins; and 5,325,841 issued Jul. 5, 1994, to V. Hooper, Sr. These examples disclose some type of air draft control mechanism. Raney discloses separate cooking and fuel compartments in which a dual vent arrangement exists above the cooking compartment for releasing flue gases and an air intake mechanism having an elongated, adjustable metal strip. A hot plate exterior exists above the fuel compartment. Raney teaches away from flame broiling foods by disclosing separate fuel and cooking compartments compartmentalized by an inclined plate needed to control air draft direction. Weir discloses a flue having a damper and an air intake having a damper in a non-portable barbecue oven for uniform grilling. Weir teaches using insulated walls and teaches away from using a drip pan. Blevins discloses an electric motor-driven fan and blower for inducing a draft. Blevins also discloses using a thermostat connected to the motor fan for automatically regulating the temperature within the housing. Hooper discloses using a series of intake holes having a slidable strip of metal for controlling the air intake, a top flue with a primary vent, and series of secondary vents cut along the side of the combustion chamber. Hooper teaches that these secondary vents are required in order to release the harmful carbon monoxide gases effected by the burning hot fuel.

Another example of the above-mentioned prior art includes U.S. Pat. No. 3,033,191 issued May 8, 1962, to J. C. Bonadiman. Bonadiman discloses a cooking device which uses water to quickly extinguish the burning hot fuel, flush most used charcoal down a drain, and clean the inside of the cooking device. Bonadiman's cooking device is generally considered to be non-portable due to the water hose which must be attached to the top of the device. Bonadiman does not disclose any type of adjustable fire lift. Furthermore, Bonadiman teaches toward insulating the lid or cover.

None of the above inventions and patents, taken either singly or in combination, is seen to describe the instant invention as claimed. Thus a portable outdoor solid fueled cooking assembly solving the aforementioned problems is desired.

SUMMARY OF THE INVENTION

The portable outdoor solid fueled cooking assembly according to the present invention includes a portable shell having a pair of side walls and top and bottom opposing walls defining an interior combustion chamber. The cooking assembly also includes at least one inlet within one of the side walls, at least one outlet within the top wall, and a vertically adjustable support member entirely contained within the interior and disposed about the bottom wall. A heat source emitting both radiant heat and convection gases is capable of being entirely supported by the support member. The cooking assembly includes a structure for controlling the radiant heat by physically manipulating at least one component of the combustion air register, as well as at least one cooking area for cooking a variety of foodstuffs by indirect communication with the heat source. The cooking assembly according to the present invention permits a user to quickly obtain the proper temperature for cooking the foodstuffs in a variety of different ways including roasting, baking, broiling, searing, or smoking; vary the cooking temperature with a reasonable degree of precision; and quickly and efficiently extinguish the heat source in order to ready the assembly for transport and salvage any remaining fuel material for subsequent cooking cycles.

Accordingly, it is a principal object of the invention to provide a completely portable barbecue assembly having a tight seal requiring as little as one sixth of the fuel per cooking cycle compared with other types of solid fueled portable outdoor cooking equipment.

It is another object of the invention to provide a portable barbecue assembly which operates on wood and charcoal, or charcoal fuel to impart a smoked flavor to food.

It is a further object of the invention to provide a solid fueled barbecue assembly that competes with gaseous or liquid hydrocarbon barbecue grills requiring a relatively short start-up time before cooking.

Still another object of the invention is to provide an accurate, compact, portable mechanism for detecting temperature which may be removably inserted in the cooking chamber, such that the portable detecting mechanism may be used to check the temperature inside the cooking chamber, as well as food temperature.

It is an object of the invention to provide a combustion air control system which allows for finely adjusting cooking temperature, similar to gas or liquid hydrocarbon fueled grills, electric grills, or ovens.

It is another object of the invention to provide a removable, vented, and rotatable ash and fuel support pan entirely contained within the cooking assembly, such that spacing between the hot fuel and the food grill may be adjusted in order to help obtain optimum cooking conditions.

It is an object of the invention to provide one cooking area on top of the combustion chamber, similar to that of a stove top; another cooking area in direct contact with the radiant heat emitted by the hot fuel inside the combustion chamber, similar to that of an open pit barbecue; and yet another cooking area in indirect contact with the radiant heat emitted by the hot fuel inside the combustion chamber, similar to that of a broiler.

It is an object of the invention to provide improved elements and arrangements thereof in an assembly for the purposes described which is relatively inexpensive, dependable, durable, and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
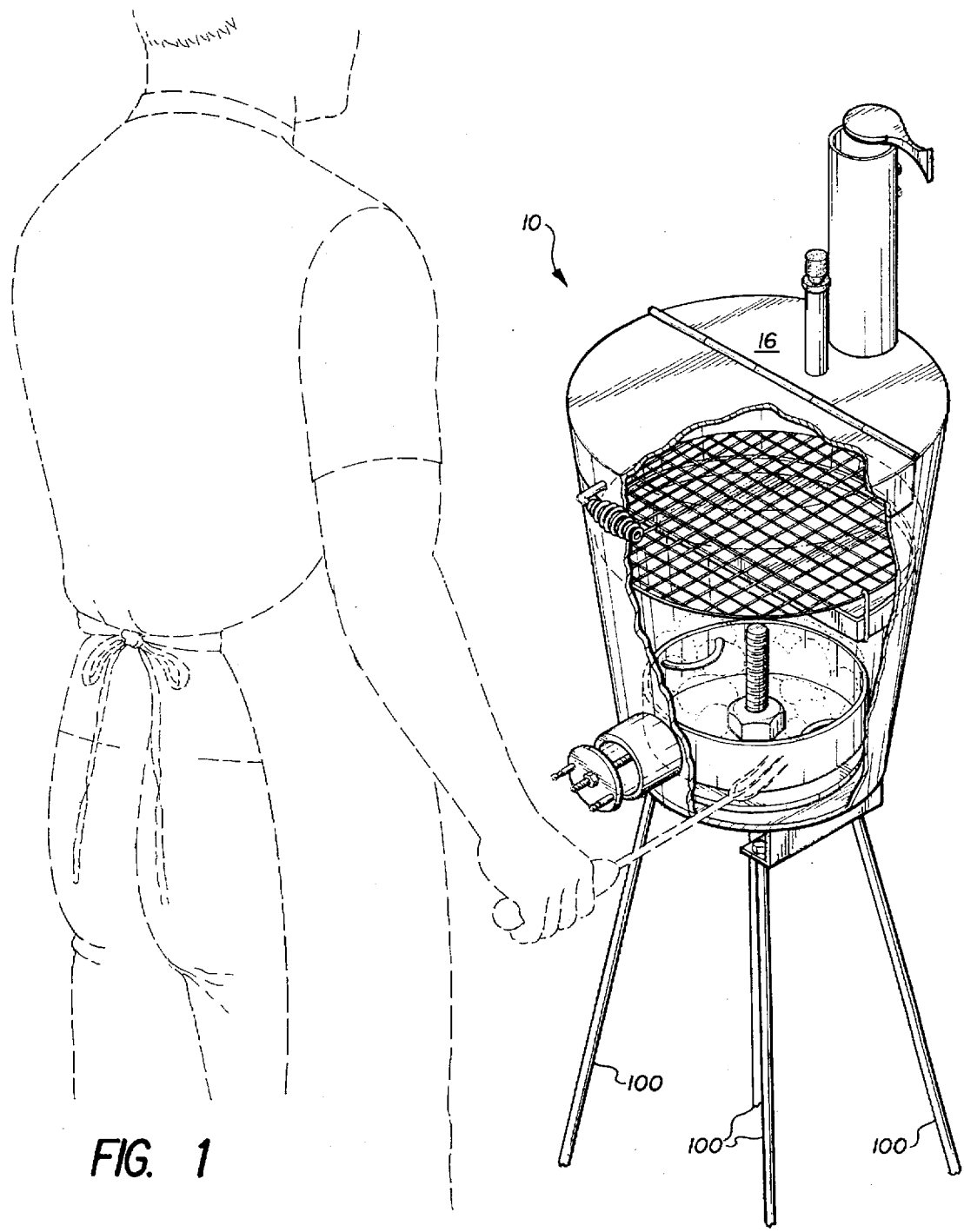
FIG. 1 is an environmental perspective view of one embodiment of the portable outdoor solid fueled cooking assembly according to the present invention.

As depicted in FIGS. 1–4, the present invention relates to a portable outdoor solid fueled cooking assembly 10 having a metal shell 11 with a pair of side walls 12, 14 and top and bottom opposing walls 16, 18, respectively, defining an interior combustion chamber 40. The cooking assembly 10 includes an air intake 20 protruding from a bottom portion of one of the side walls 12, 14, and a flue gas outlet 22 detachably secured to the top wall 16. The outlet 22 has a dampening mechanism 24 affixed thereto.

Figure 2:
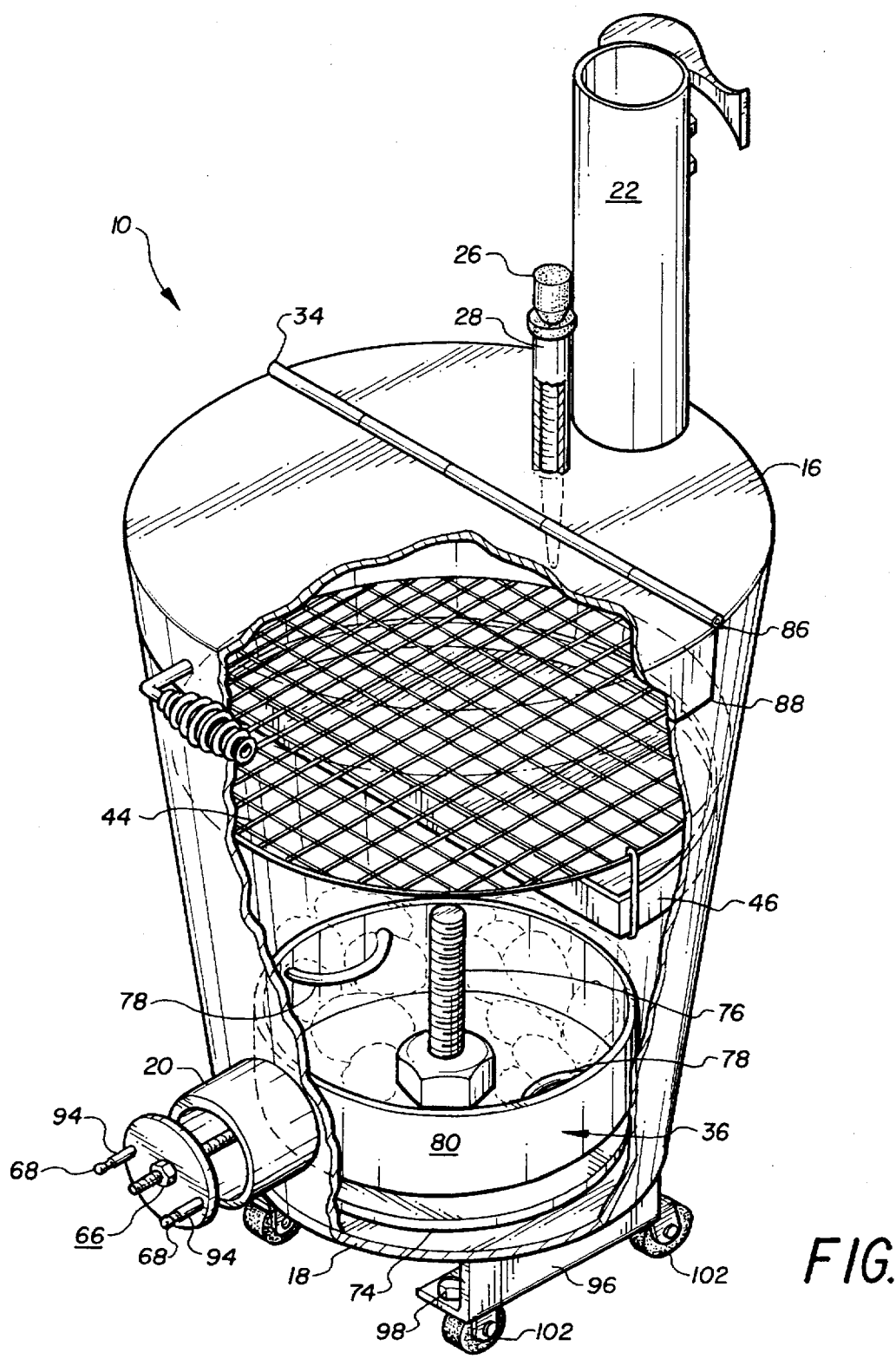
FIG. 2 is an enlarged, perspective view of the portable outdoor solid fueled cooking assembly as seen in FIG. 1.
Figure 4:
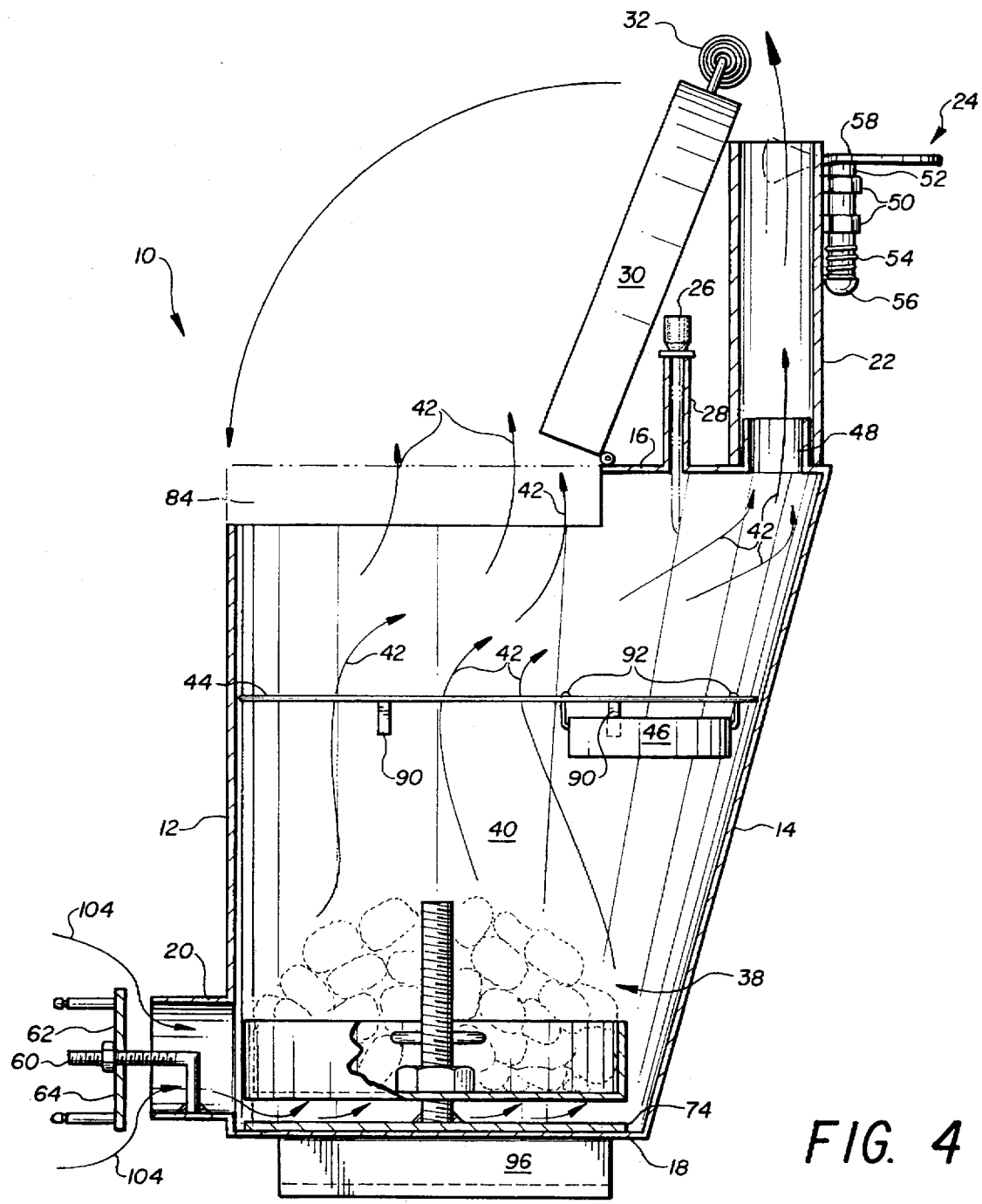
FIG. 4 is a cross-sectional view of the portable outdoor solid fueled cooking assembly as seen in FIG. 3, drawn along lines 4—4 in FIG. 3.

As seen in FIGS. 1, 2, and 4, the cooking assembly 10 also includes a portable thermometer 26 inserted into a thermometer sleeve 28 in the top wall 16; a lid 30, having a wire handle 32, pivotally attached to the top wall 16 by a hinge 34 wherein the lid 30 is designed to cook foodstuffs (not shown) thereon, and a vertically rotating ash and fuel pan 36 entirely contained within the interior of the combustion chamber 40. Finitely reusable heat source 38 may be placed on top of the pan 36 and ignited such that the heat source 38 emits radiant heat (not shown) and convection gases 42 directly toward the top wall 16. Inside the chamber 40 of the cooking assembly 10, a metal grill 44 is supported by a set of metal clips 90. A grease drippings pan 46 may be detachably secured to a portion of the grill 44.

The cooking assembly 10 according to the present invention permits a user to quickly obtain a desired temperature for cooking a variety of foodstuffs on top of the lid 30 and/or on top of the grill 44, vary the cooking temperature with a reasonable degree of precision, and efficiently extinguish any remaining finitely reusable heat source 38 in order to ready the cooking assembly 10 for transport as well as salvage any remaining heat source 38 for the next cooking cycle.

As can be seen in FIG. 4, the outlet 22 is detachable and slidably engageable by an outlet sleeve 48 protruding near one edge of the top wall 16. The outlet 22 includes a pair of rings 50 attached to one side thereof wherein the dampening mechanism 24 is slidably secured. The dampening mechanism 24 has a rod 52 and spring 54 held around the rod 52 by a cap 56 attached to one end of the rod 52. The rod 52 is slidably engageable through the pair of rings 50 and held into place by the spring 54 and cap 56. The rod 52 includes a slide damper 58 integrated into one end, wherein the slide damper 58 is designed to incrementally cover one end of the outlet 22 (as seen in FIG. 1).

As can be seen in FIG. 4, the intake 20 has an L-shaped threaded rod 60 attached to an inside portion thereof. This L-shaped threaded rod 60 is used to rotatably secure an air register plate 62 having a center hole 64 and a nut 66 attached to one side of the plate, wherein the nut 66 is attached to air register plate 62 over the center hole 64. The air register plate 62 further includes a pair of metal handles 68, each of which is attached opposite one another on the same side of the register plate 62 as the nut 66.

Figure 3:
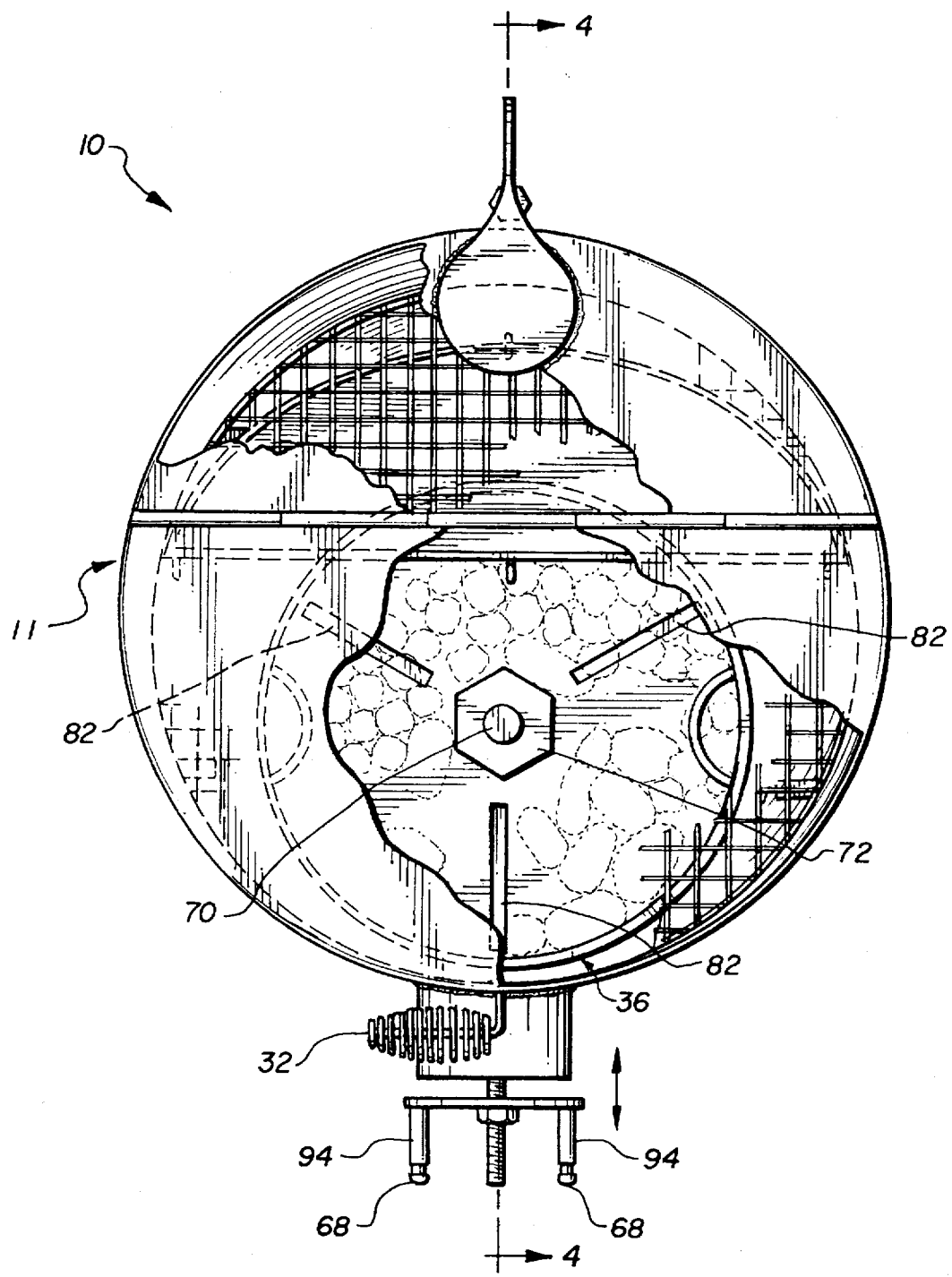
FIG. 3 is a top view of a second embodiment of the portable outdoor solid fueled cooking assembly according to the present invention, with portions thereof broken away to expose the interior of the assembly.

As can be seen in FIG. 3, the ash and fuel pan 36 has a center hole 70 and a nut 72 attached to one side thereof, wherein the nut 72 is designed to surround the center hole 70. Resting on the bottom wall 18 inside the combustion chamber 40, a bottom support plate 74 has an all-thread rod 76 protruding from the center of the support plate 74. The ash and fuel pan 36 is detachably secured to the support plate 74 by inserting the all-thread rod 76 into the support pan's center hole 70 and rotating the support pan 36 until a distance desired from the support plate 74 is achieved. The ash and fuel pan 36 further includes a pair of handles 78 oppositely integrated into walls 80 protruding inside the ash and fuel pan 36. The pan's walls 80 form a container wherein the finitely reusable heat source 38 is placed. The ash and fuel pan 36 further includes multiple radial slots 82 which allow for the heat source 38 to be ventilated with fresh air 104.

As can be seen in FIGS. 2 and 4, an opening 84 is cut into the top wall 16 to receive a lid 30, which is pivotally attached to an upper edge 86 by the hinge 34 and closely seats on a lower edge 88 of wall 12 to provide access to the chamber 40. The metal grill 44 is supported inside the chamber 40 by a pair of metal support clips 90 which are attached to each of the side walls 12, 14. The grease drippings pan 46 is detachably secured to the grill 44 such that grill 44 is provided a protected portion 92. The protected portion 92 permits only indirect communication of the radiant heat emitted by the heat source 38 to the foodstuffs placed on top of the grill 44 above the protected portion 92. Furthermore, grease drippings (not shown) produced by the cooking of foodstuffs are prevented from contacting the heat source 38 if the foodstuffs are placed on top of the grill 44 above the protected portion 92. Alternatively, foodstuffs may be placed on top of the grill 44 proximate to the protected portion 92 in order to have the foodstuffs and the grease drippings in direct communication with the radiant heat emitted by the heat source 38.

In the preferred embodiment, the cooking assembly 10 may be made entirely out of stainless steel, carbon steel, or aluminum.

If the assembly 10 is made entirely out of a stainless steel material, such as type 304, no maintenance procedures should ever be required and the useful life of the assembly should approach or exceed a century of continuous service. However, in order to reduce cost, carbon steel or aluminum may be substituted for stainless steel. If carbon steel or aluminum is used to make the weather-exposed parts, this will result in a periodic maintenance requirement of wire brushing or sand blasting and painting in order to prevent external corrosion from rain and humid air exposure. Interior parts made of carbon steel or aluminum would slowly corrode from exposure to food residue and combustion atmospheres, but a cooking assembly 10 constructed of such materials will generally have a useful life of at least 25 years. To achieve such a long useful life, the external components of the cooking assembly 10 are required to be at least one-eighth inch thick. Furthermore, the ash and fuel pan 36 is required to be of carbon steel or stainless steel for heat resistance.

Regardless of the type of material employed in the construction of the cooking assembly 10, the areas where air may enter and exit the cooking assembly 10 must be precisely machined such that a virtually air-tight seal is effected. With respect to the lid 30, an edge clearance of approximately 0" to 0.030" will essentially eliminate air leakage. With respect to the air intake 20, precise machining of the face of the intake 20 along with careful axial alignment of the threaded rod 60 will provide a tight-sealing clearance between the intake 20 and the air register plate 62 of approximately 0" to 0.030" such that no gasket is required. With respect to the outlet 22, precise machining of its top end in conjunction with a perfectly flat slide damper 58 and a spring 54 designed to bias the slide damper 58 toward the machined end of outlet 22 will provide a reliably sealed clearance of approximately 0" to 0.030".

Other preferences include each of the rods 60 and 76 having a thread pitch between 12–16 threads per inch. The length of the straight all-thread rod 76 depends on the overall depth of the combustion chamber 40; however, the minimum preferred length is three inches. The pair of metal handles 68 should each be loosely fitted with a sleeve 94 in order to minimize heat exposure to the user by conduction while adjusting the air register plate 62. In a similar manner, the wire handle 32 should be of a thermal resistant material. With respect to the thermometer 26, a digital one which is battery powered and completely portable is preferred. The top head of the thermometer 26 should contain the electronics, the battery, and a liquid crystal digital temperature display on the top face of the top head. The lower end of the thermometer 26 should be made of a food grade stainless steel having a pointed shaft with a thermal sensor internally fixed near the pointed shaft end. The length of the stainless steel lower-sensor-end of the thermometer 26 is preferably four and one-half to five inches measured from below the top of the thermometer sleeve 28. The preferred length of the thermometer sleeve 28 is three inches. This prevents the digital thermometer 26 from significantly interfering with the foodstuffs in the combustion chamber 40 while protecting the delicate electronic components in the thermometer 26 itself. Since the digital thermometer 26 is portable, it may also be used to measure the internal temperature of foodstuffs during cooking to check for doneness. For this reason, the preferred range of the digital thermometer 26 is from ambient temperature up to and including at least 450 degrees Fahrenheit with a preferred accuracy of ±5 degrees Fahrenheit.

Further preferences include using wood and charcoal, or charcoal fuel to be ignited by lighter fluid as the heat source 38. The cooking assembly 10 should also include a detachable cover (not shown) which is slidably engageable over the outlet sleeve 48 in order to ready the cooking assembly 10 for safe transport. In addition, the cooking assembly 10 should also include a rigid support member 96 attached to an exterior surface of the bottom wall 18, wherein the support member 96 has a mounting mechanism 98 for fitting legs 100 (shown in FIG. 1) and/or wheels 102 (shown in FIG. 2).

In operation, the lid is opened and the grill is removed to permit installing the heat source comprising wood and charcoal, or charcoal fuel. It is sometimes desirable to add water soaked hard wood, such as oak, pecan, mesquite, etc., in order to impart an even greater smoked flavor to the foodstuffs than by charcoal alone. The ash and fuel pan may have to be removed prior to installing the heat source in order to dispose of residual ashes. Upon reinstalling the ash and fuel pan, the bottom should be positioned approximately one-quarter inch from the support plate by rotating the ash and fuel pan about the straight all-thread rod.

Depending on the type of foodstuffs being cooked, the user may desire uniform cooking or less uniform cooking. For example, if the user intends on cooking the same variety of foodstuffs, a uniform cooking effect is highly desirable. Such a uniform cooking effect is produced when the ash and fuel pan is designed to be centrally located within the cooking chamber such that heat is emitted equally to all portions of the grill, as shown in the embodiment of FIGS. 1 and 2. Therefore, if the user desires uniform cooking, the user should employ the cooking assembly as seen in FIGS. 1 and 2 wherein both of the side walls have a concentric shape. Alternatively, if the user intends on cooking an array of different foodstuffs at the same time, a less uniform cooking effect is desired. A less uniform cooking effect is produced when the heat source emits heat more towards one side of the chamber than another. If the user desires such a cooking effect, the user should employ the cooking assembly as seen in FIGS. 3 and 4, wherein both of the side walls have an eccentric shape. Furthermore, if the user employs the grease drippings pan in conjunction with the embodiment as seen in FIGS. 3 and 4, an even less uniform cooking effect will be produced, effectively allowing the user to cook a variety of foodstuffs at the same time.

Regardless of which embodiment the user so chooses, the heat source is then installed such that it completely fills the confines of the pan. The top of the heat source should cover the top of the straight all-thread rod, forming an angle of repose that is stable against the inside of the pan (as seen in FIG. 4). Lighter fluid (not shown) is then applied on the heat source and allowed to soak for one minute. The air register plate should be fully opened prior to lighting the heat source, while the slide damper should remain fully closed. The heat source may now be lit and the hinged lid should remain open. After 6–8 minutes from lighting, flaming from burning of the lighter fluid should cease. At this time, the grill and digital thermometer may be positioned inside the cooking assembly. If desired, the grease drippings pan may be installed on the grill prior to positioning the grill inside the assembly. The lid should now be closed and the slide damper should be opened fully (as seen in FIG. 2) during the remainder of the start-up time, which is 15–20 minutes from lighting. After 20 minutes (or less), the digital thermometer will indicate a temperature generally greater than 300 degrees Fahrenheit. With a fresh charge of heat source, the cooking temperature will be above 350 degrees Fahrenheit after a maximum heat-up time of 20 minutes from lighting.

Foodstuffs may now be cooked by opening the lid and placing the foodstuffs on the grill directly over the heat source. Alternatively, if the grease drippings pan is installed, foodstuffs may be cooked on the grill above the drippings pan indirectly over the heat source. Furthermore, since the lid is not insulated, if the user so chooses, the top portion of the lid may be employed as a cooking area similar to a stove top whenever the lid is in the closed position (as seen in FIGS. 1–3). Once the lid is in the closed position, the cooking temperature will gradually increase according to the measurement of the digital thermometer, sensing variation as it occurs. The user may choose to adjust the air register plate in order to keep the cooking temperature from continuing to rise, or if preferred, in order to lower the temperature. The design of the air register permits the maximum cooking temperature to be reached when the air register plate is fully opened to the end of the L-shaped threaded rod. This maximum cooking temperature should be approximately 450 degrees Fahrenheit. The minimum cooking temperature is achieved by closing the air register plate to within one quarter turn from fully contacting the intake. Thus, the air register plate operates somewhat like a fuel valve on a gaseous or liquid hydrocarbon fueled barbecue grill, or analogous to a temperature controller for an electrically heated barbecue assembly.

If extremely slow cooking at low temperature is desired, the air register plate should be nearly closed and the slide damper should be throttled to less than halfway open. This reduces the air draft available for combustion air to pass through the intake. In such a manner, the cooking temperature may be adjusted to a range of 225 to 250 degrees Fahrenheit, permitting the foodstuffs to remain cooking undisturbed for a period of time greater than one hour. Thus, regulation of the slide damper is another means of fine-tuning the cooking temperature within the combustion chamber.

If it is desirable to avoid searing or flame broiling meat, this can be accomplished by several methods. If fast cooking is desired, then the meat may be cooked over the protected portion of the grill above the grease drippings pan. This insures that meat grease will not drip onto the heat source causing a flame-up or a broiling effect. Alternately, if fast cooking is desired with grease drippings adding to the smoked flavor of the meat, the user can operate at a cooking temperature between 350–400 degrees Fahrenheit, place the meat on the grill directly above the heat source, and then turn down the combustion air register plate to about 10–25 percent open. The lack of substantial combustion air prevents searing since the heat source absorbs the limited oxygen supply to support slow combustion, resulting in the temperature falling to approximately 300 degrees Fahrenheit over a 15–20 minute time period.

For faster cooking of meats such as steak or hamburgers where a searing or broiling effect is desired, the air register plate should be set to a nearly open position achieving a cooking temperature range between 350 to 450 degrees Fahrenheit or according to user cooking preference.

During cooking, the foodstuffs may be turned one or more times by opening the lid. During servicing of the foodstuffs, the digital thermometer may be removed from its thermometer sleeve, cooled briefly, and inserted within the foodstuffs to determine the interior food temperature. The thermometer may then be replaced into its sleeve to further monitor the cooking temperature within the cooking chamber. Other conventional bi-metallic dial cooking thermometers may be inserted and remain in the foodstuffs while cooking, if this is desirable.

When it is determined that the foodstuffs have fully cooked, the heat source may be extinguished by fully closing the air register plate and the slide damper. The lid should also be closed after the foodstuffs have been removed. This causes the heat source to extinguish, salvaging any heat source remaining in the chamber for the next cooking cycle. The cooking space temperature will cool below 150 degrees Fahrenheit in 60–90 minutes after the heat source is extinguished. At such a temperature range, the heat source will not re-ignite when exposed to air, effectively allowing the user to safely transport the cooking assembly in a passenger vehicle. In order to completely ready the cooking assembly for transport, the outlet should be removed and replaced with the detachable cap. This ergonomic design allows the user to place the cooking assembly into the closed trunk of a passenger vehicle for transport to even remote outdoor areas totally without electricity.

Any heat source remaining after the user has extinguished it may be ignited and re-used for additional cooking up to five more times following the first cooking cycle. A cooking cycle is defined as 20 minutes of start-up time followed by 40 minutes of cooking time at a cooking temperature in the range of 250–450 degrees Fahrenheit. For example, a cooking assembly according to the present invention, wherein the cooking assembly has 175 square inches of grill surface and six pounds of charcoal fuel installed, can be operated at a cooking temperature between 225–450 degrees Fahrenheit, achieving an average fuel consumption rate of 0.9–1.1 pounds per hour of charcoal fuel, equivalent to 0.005–0.006 pounds per hour per square inch of cooking surface.

After each cooking cycle, the heat source will settle in the pan by about one-quarter to one-half inch. The clearance between the top of the heat source and the bottom of the grill may be reduced by removing the grill and then rotating the pan counterclockwise to raise the heat source for the next cooking cycle. The raising of the pan assists to maintain cooking temperature in the range of 225–450 degrees Fahrenheit when the grill is re-installed for cooking, assuming the user adjusts the settings of the air register plate and sliding damper as needed.

After several cooking cycles, fuel ash builds up on the bottom of the pan, resulting in a partial blockage of the radial slots which further results in a lower rate of combustion and lower maximum cooking temperature. By having a sufficient number and arrangement of radial slots, such a buildup will be ameliorated. Of course, when ash does buildup, it can be observed prior to heat source lighting such that the user may clear the ash debris away from the slots before arranging the heat source as described before. Upon nearly complete use of the originally installed heat source, the user may grasp the pan by the pair of handles integrated into its sides, lift the pan from within the chamber, and carry it away for ash disposal.

During the last practical cooking cycle heated with a small residual quantity of heat source, cooking temperature may be somewhat low, in the range of 250–300 degrees Fahrenheit. For slow cooking, this is not a problem. However, for fast cooking of certain foods, this indicates to the user the need to re-charge the heat source following this cooking cycle. Normally, all cooking cycles will have substantial temperature control using the combustion air register plate and the dampening mechanism, except for this last cycle, which results in using up almost all of the heat source.

It is to be understood that the present invention is not limited to the sole embodiment described above, but encompasses any and all embodiments within the scope of the following claims.

We claim:

1. A portable outdoor solid fueled cooking assembly for cooking at least one variety of foodstuffs with a heat source capable of radiating heat and convection gases, said cooking assembly comprising:

a shell having a pair of side walls and a top wall and bottom wall defining an interior;

a combustion air register having at least one inlet within one of said pair of side walls, at least one outlet within said top wall, and a vertically adjustable support member entirely contained within said interior and disposed about said bottom wall, said support member supporting the heat source radiating heat and convection gases toward said top wall;

a means for controlling the radiant heat emitted by the heat source by physically manipulating said combustion air register; and at least one food support means for cooking the foodstuffs by indirect communication of the heat source to the foodstuffs, wherein said food support means includes a grill supported in the interior of said cooking assembly by a pair of metal support clips attached to each of said side walls, said grill having a grease drippings pan detachably secured to a protected portion of said grill;

whereby a user may quickly obtain a desired temperature for cooking the foodstuffs, vary the cooking temperature with a reasonable degree of precision, and quickly and efficiently extinguish the heat source in order to ready said assembly for transport.

2. A portable outdoor solid fueled cooking assembly as defined in claim 1, wherein said controlling means includes a rotatable plate and a sliding damper, said plate indirectly secured to said inlet and designed to axially extend outward from said inlet whereby air is allowed to enter into said cooking assembly, said sliding damper engaged to said at least one outlet and designed to incrementally seal said at least one outlet whereby convection gases may exit out of said cooking assembly.

3. A portable outdoor solid fueled cooking assembly as defined in claim 2, wherein said controlling means further comprises a threaded rod and a nut, said rod attached to an interior portion of said inlet, and said nut attached to one side of said plate and designed to surround a bore running through said plate, said side of said plate said nut is attached to having at least one handle protruding outward therefrom, whereby said rod is inserted through said bore and said plate is rotated about said rod by the user turning said handle, said handle being turned by said user until the plate is a desired distance from said inlet.

4. A portable outdoor solid fueled cooking assembly as defined in claim 2, wherein said damper further comprises a rod and a spring, said rod integrally attached to said damper, said spring held around one end of said rod by a cap secured to said rod end, and wherein further said rod is slidably engaged to said outlet by rings protruding from said outlet having received said rod.

5. A portable outdoor solid fueled cooking assembly as defined in claim 1, wherein said top wall includes a sleeve protruding therefrom, whereby the user may slidably engage said outlet before igniting the heat source, and whereby the user may place a detachable cover slidably engageable over said sleeve after detaching said outlet in order to ready said cooking assembly for transport.

6. A portable outdoor solid fueled cooking assembly as defined in claim 1 further comprising a portable means for detecting the temperature, wherein said portable detecting means is a thermometer slidably fitted through a sleeve protruding outward from said top wall, said thermometer having a length designed to partially enter into said interior.

7. A portable outdoor solid fueled cooking assembly as defined in claim 1, wherein said vertically adjustable support member includes a portable assembly comprising a bottom plate resting on said bottom wall; a straight all-thread rod attached to the bottom plate and extending toward said top wall; and a circular fuel pan having a hole centrally located through said pan, a nut attached to one side of said pan, a rim wall depending circumferentially from said circular fuel pan in order to define a container, and at least one radial slot within said circular fuel pan, whereby the heat source may be placed into said container and ignited, whereby further air is allowed to enter through said radial slot in order to provide oxygen to the heat source, and whereby further a user may rotate said pan and nut about said rod in a direction towards said top wall and in a direction away from said top wall as desired.

8. A portable outdoor solid fueled cooking assembly as defined in claim 1, wherein said side walls are configured to have a concentric shape for uniformly cooking the foodstuffs.

9. A portable outdoor solid fueled cooking assembly as defined in claim 1, wherein said side walls are configured to have an eccentric shape for cooking the foodstuffs at the same time without a uniform cooking effect.

10. A portable outdoor solid fueled cooking assembly as defined in claim 1, wherein said top wall defines an opening having a top edge and a bottom edge, wherein said top edge has a hinge mechanism pivotally securing a lid, said lid having a handle and a flat top surface, whereby a user may open said cooking assembly by raising said lid in order to place the heat source into said interior.

11. A portable outdoor solid fueled cooking assembly as defined in claim 1, wherein said food support means includes the exterior of said top wall.

12. A portable outdoor solid fueled cooking assembly as defined in claim 1 further comprising a rigid support member attached to an exterior surface of said bottom wall, said support member having a means for mounting legs, wheels, or a combination thereof.

13. A portable outdoor solid fueled cooking assembly for cooking at least one variety of foodstuffs with a finitely reusable heat source capable of radiating heat and convection gases, said cooking assembly comprising:

a metal shell having a pair of side walls and top and bottom opposing walls defining an interior combustion chamber;

a first sleeve protruding from a bottom portion of one of said side walls;

a second sleeve protruding from said top wall;

a third sleeve protruding from said top wall proximate to said second sleeve;

an opening cut into said top wall proximate to said second and third sleeves, said opening having an upper edge and a lower edge;

a lid having a wire handle attached thereto, said lid pivotally attached to said top wall at said upper edge by a hinge, said lid designed to cook foodstuffs thereon;

a detachable outlet slidably engageable by said second sleeve, said outlet having rings attached to one side of said outlet;

a dampening mechanism having a rod and spring held around said rod by a cap attached to one end of said rod, said rod slidably engageable through said rings and frictionally held into place by said spring and cap, said rod having a slide damper integrated into said rod and designed to incrementally cover one end of said outlet;

an L-shaped threaded rod having first and second ends, said first end attached to an inside portion of said first sleeve and protruding outward therefrom;

an air register plate having a center hole and a nut attached to said plate around said center hole, said air register plate further including a pair of metal handles oppositely attached to one side of said air register plate for rotating said air register plate about said second end of said L-shaped threaded rod to a desired distance from said first sleeve;

a bottom support plate resting entirely inside said chamber, said plate having a straight all-thread rod attached at one end to a center portion of said support plate;

a rotatable ash and fuel pan having a center hole and a nut attached to said ash and fuel pan around said center hole, said ash and fuel pan to be rotated about said straight all-thread rod until a desired distance from said bottom support plate;

a metal grill supported inside said chamber by a pair of metal clips attached to each of said side walls, said grill having a grease drippings pan detachably secured to a protected portion of the grill; and a thermometer slidably fitted through said third sleeve, said thermometer having a length designed to partially enter into said interior chamber;

whereby a user may ignite the heat source placed on top of said pan, quickly obtain a desired temperature for selectively cooking the foodstuffs on top of said lid and on top of said grill, such that foodstuffs placed on top of said protected portion of said grill are in indirect communication with the radiant heat emitted by the heat source cooking foodstuffs, and grease drippings originating from the foodstuffs are prevented from contacting the heat source, and such that foodstuffs placed on top of said grill proximate to said protected portion are in direct communication with the heat source; vary the cooking temperature with a reasonable degree of precision; and efficiently extinguish the heat source in order to ready said cooking assembly for transport and salvage any remaining heat source for additional cooking cycles.

14. A portable outdoor solid fueled cooking assembly as defined in claim 13 wherein said finitely reusable heat source is selected from the group consisting of a combination of wood and charcoal, and charcoal.

15. A portable outdoor solid fueled cooking assembly as defined in claim 13 further comprising a detachable cover slidably engageable over said second sleeve after detaching said outlet in order to ready said cooking assembly for safe transport.

16. A portable outdoor solid fueled cooking assembly as defined in claim 13 further comprising rigid support members attached to an exterior surface of said bottom wall, said rigid support members having a means for mounting legs, wheels, or a combination thereof.

17. A portable outdoor solid fueled cooking assembly as defined in claim 13, wherein said side walls are configured to have a concentric shape for uniformly cooking the foodstuffs.

18. A portable outdoor solid fueled cooking assembly as defined in claim 13, wherein said side walls are configured to have an eccentric shape for cooking the foodstuffs at the same time without a uniform cooking effect.

* * * * *